United States Patent
Yeh et al.

(10) Patent No.: US 8,558,722 B2
(45) Date of Patent: Oct. 15, 2013

(54) TOUCH APPARATUS, TRANSPARENT SCAN ELECTRODE STRUCTURE, AND MANUFACTURING METHOD THEREOF

(75) Inventors: Shao-Hsing Yeh, Hsinchu (TW); Nai-Hao Kuo, Qieding Township, Kaohsiung County (TW); Yu-Tang Shen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 410 days.

(21) Appl. No.: 12/847,684

(22) Filed: Jul. 30, 2010

(65) Prior Publication Data

US 2011/0140930 A1 Jun. 16, 2011

Related U.S. Application Data

(60) Provisional application No. 61/285,474, filed on Dec. 10, 2009.

(30) Foreign Application Priority Data

Apr. 19, 2010 (TW) ................................ 99112238 A

(51) Int. Cl.
*H05B 41/46* (2006.01)
*H01J 9/00* (2006.01)
*H03K 17/94* (2006.01)

(52) U.S. Cl.
USPC .................................. 341/20; 314/1; 445/46

(58) Field of Classification Search
USPC ................... 341/20, 155, 22; 314/1; 445/46; 345/173–174, 208
See application file for complete search history.

(56) References Cited

U.S. PATENT DOCUMENTS

| | | | |
|---|---|---|---|
| 4,990,725 A | 2/1991 | Mizzi | |
| 5,062,198 A | 11/1991 | Sun | |
| 5,181,030 A | 1/1993 | Itaya et al. | |
| 5,283,558 A | 2/1994 | Chan | |
| 5,451,724 A | 9/1995 | Nakazawa et al. | |
| 5,505,072 A | 4/1996 | Oreper | |
| 5,521,336 A | 5/1996 | Buchanan et al. | |
| 5,756,904 A | 5/1998 | Oreper et al. | |
| 5,856,822 A | 1/1999 | Du et al. | |

(Continued)

FOREIGN PATENT DOCUMENTS

| | | |
|---|---|---|
| TW | 498364 B | 8/2002 |
| TW | I229282 B | 3/2005 |
| TW | 201015398 | 4/2010 |
| TW | 201019180 | 5/2010 |

OTHER PUBLICATIONS

English Abstract translation of TWI229282 (Published Mar. 11, 2005).

(Continued)

*Primary Examiner* — Hieu Nguyen
(74) *Attorney, Agent, or Firm* — McClure, Qualey & Rodack, LLP

(57) ABSTRACT

A touch apparatus, a transparent scan electrode, a geometric electrode structure and a manufacturing method thereof are disclosed. The transparent scan electrode structure comprises a first transparent scan electrode, a second transparent scan electrode and an isolative layer. The first transparent scan electrode comprises a first resistance region and a second resistance region. A resistance value of the second resistance region is higher than that of the first resistance region. The isolative layer is disposed between the first transparent scan electrode and the second transparent scan electrode.

52 Claims, 14 Drawing Sheets

(56) References Cited

U.S. PATENT DOCUMENTS

| | | |
|---|---|---|
| 6,529,188 B1 | 3/2003 | Suzuki et al. |
| 6,628,269 B2 | 9/2003 | Shimizu |
| 6,639,587 B2 | 10/2003 | Carpenter et al. |
| 6,977,646 B1 | 12/2005 | Hauck et al. |
| 7,492,358 B2 | 2/2009 | Chi et al. |
| 2007/0198926 A1 | 8/2007 | Joguet et al. |
| 2009/0284398 A1 | 11/2009 | Shen et al. |
| 2010/0302180 A1* | 12/2010 | Chang et al. .......... 345/173 |

OTHER PUBLICATIONS

English Abstract translation of TW498364 (Published Aug. 11, 2002).

TW Office Action dated Mar. 26, 2013.

English language translation of abstract of TW 201015398 (published Apr. 16, 2010).

English language translation of abstract of TW 201019180 (published May 16, 2010).

* cited by examiner

TOUCH APPARATUS, TRANSPARENT SCAN ELECTRODE STRUCTURE, AND MANUFACTURING METHOD THEREOF

This application claims the benefit of U.S. provisional application Ser. No. 61/285,474, filed Dec. 10, 2009 and Taiwan application Serial No. 99112238, filed Apr. 19, 2010, the subject matter of which is incorporated herein by reference.

BACKGROUND

1. Technical Field

The disclosure relates in general to a touch apparatus, a transparent scan electrode, a geometric electrode structure and a manufacturing method thereof, and more particularly to a touch apparatus with high resistance, a transparent scan electrode and a manufacturing method thereof.

2. Description of the Related Art

Of the array touch technologies, the capacitive touch technology and the resistive touch technology are the mainstream real-multi-touch technologies that have been widely used in 3C consumer electronic products. The capacitive touch technology mainly changes the capacitance of a touch element through the electrostatic induction of the touch element so that the back-end microcontroller can sense the change in the charges and further transform the charges into a touch signal. The resistive touch technology mainly transforms the change in a resistance value into a touch signal through the wire resistance of the touch element and the touch point equivalent resistance conducted when being touched.

Referring to FIG. 1, a schematic diagram of conventional transparent scan electrode structure is shown. In the part of a conventional resistive array touch panel structure, the transparent scan electrode structure 1 comprises row electrodes 12, column electrodes 14 and bumps 16. The row electrodes 12 and the column electrodes 14 are strip (line, film) electrodes vertically interlaced and perpendicular to each other. The bumps 16 are disposed between the row electrodes 12 and the column electrodes 14 and used as an isolative layer which separates the top strip (line, film) electrodes from the bottom strip (line, film) electrodes to avoid short-circuiting.

Referring to FIG. 2 and FIG. 3. FIG. 2 shows a circuit diagram of a conventional resistive array touch panel. FIG. 3 shows a tactile-signal timing diagram of a conventional resistive array touch panel. The row electrodes R0~R7 of FIG. 2 can be realized by the row electrodes 12 of FIG. 1, and the column electrodes C0~C7 of FIG. 2 can be realized by the column electrodes 14 of FIG. 1. According to the resistive real-multi-touch technology, the main driving electrodes sequentially perform zero potential scan mechanism, so the back-end can recognize multiple touch positions through the computing of virtual 2D coordinate interpolation. However, when there are too many touch points being touched, the back-end microcontroller may not recognize correctly, and ghost blur (points) will occur accordingly.

As indicated in FIG. 3, when the touch points T1, T2 and T3 are touched at the same time, the touch points T1 and T2 are detected by the same row electrode, that is, the row electrode R1, and the touch points T2 and T3 are detected by the same column electrode, that is, the column electrode C5. When the zero potential scan mechanism scans the column electrode C0, the level of the row electrode R1 changes to the system low level due to the existence of the touch point T1. Since the switch of the touch point T2 is in off state, a short-circuiting loop occurs to the column electrode C0 and the column electrode C5, causing the level of the column electrode C5 to instantaneously change to the low level despite the column electrode C5 has not yet been scanned by the zero potential scan mechanism. Meanwhile, the touch point T3, being in the same row with the touch point T2, makes the row electrode R5 and the column electrode C5 short-circuited, and thus changes the level of the row electrode R5 to the low level. Thus, the algorithm of recognizing touch position at the back-end recognizes two touch points, namely, touch point T1 and touch point T2, when the interval of the column electrode C0 is scanned. The event that the touch points are detected by the column electrode C0 and the row electrode R5 of the timing diagram is referred as ghost blur (points).

SUMMARY

The disclosure is directed to a touch apparatus, the transparent scan electrode, a geometric electrode structure and a manufacturing method thereof.

According to a first aspect of the present disclosure, a transparent scan electrode geometric structure is disclosed. The transparent scan electrode structure comprises a first transparent scan electrode, a second transparent scan electrode and an isolative layer. The first transparent scan electrode comprises a first resistance region and a second resistance region. A resistance value of the second resistance region is higher than that of the first resistance region. The isolative layer is disposed between the first transparent scan electrode and the second transparent scan electrode.

According to a second aspect of the present disclosure, a touch apparatus is disclosed. The touch apparatus comprises a touch panel and a processing unit. The touch panel comprises a first transparent scan electrode and a second transparent scan electrode. Each first transparent scan electrode comprises a first resistance region and a second resistance region. A resistance value of the second resistance region is higher than that of the first resistance region. The isolative layer is disposed between the first transparent scan electrode and the second transparent scan electrode. The processing unit is for sequentially scanning and driving the first transparent scan electrode and the second transparent scan electrode by the tri-state (logic) scan method. The first transparent scan electrodes being driven are set in a high level output state, the remaining first transparent scan electrodes not being driven are set in a low level output state which is the lowest voltage in the system or the ground, the second transparent scan electrodes being driven are in a high impedance input state for sensing a touch signal, and the remaining second transparent scan electrodes not being driven are set in a low level output state which is the lowest voltage in the system or the ground.

According to a third aspect of the present disclosure, a manufacturing method of a transparent scan electrode geometric structure is disclosed. The manufacturing method comprises the following steps. A first transparent scan electrode is formed in the first substrate, wherein the first transparent scan electrode comprises a first resistance region and a second resistance region, and a resistance value of the second resistance region is higher than that of the first resistance region. A second transparent scan electrode is formed on the second substrate. An isolative layer is formed on the first substrate. The first substrate and the second substrate are vertically aligned and combined.

The disclosure will become apparent from the following detailed description of the preferred but non-limiting embodiments. The following description is made with reference to the accompanying drawings.

DETAILED DESCRIPTION

Figure 1:
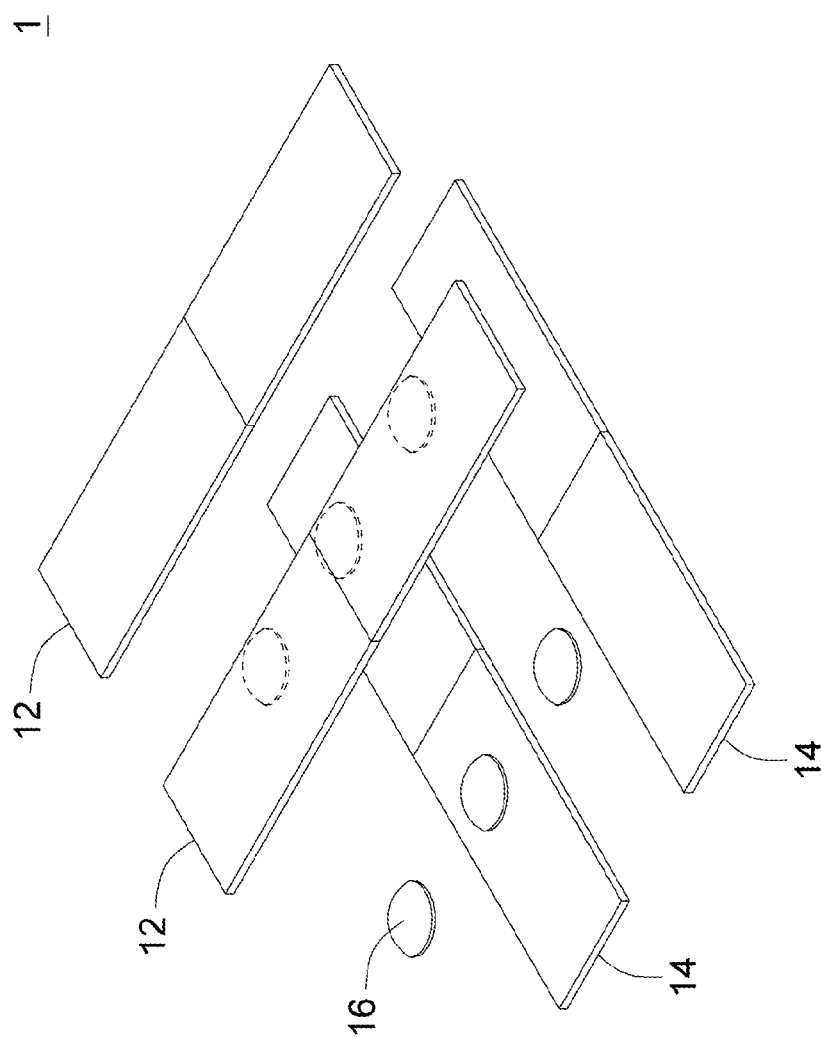
FIG. 1 shows a schematic diagram of conventional transparent scan electrode structure.
Figure 2:
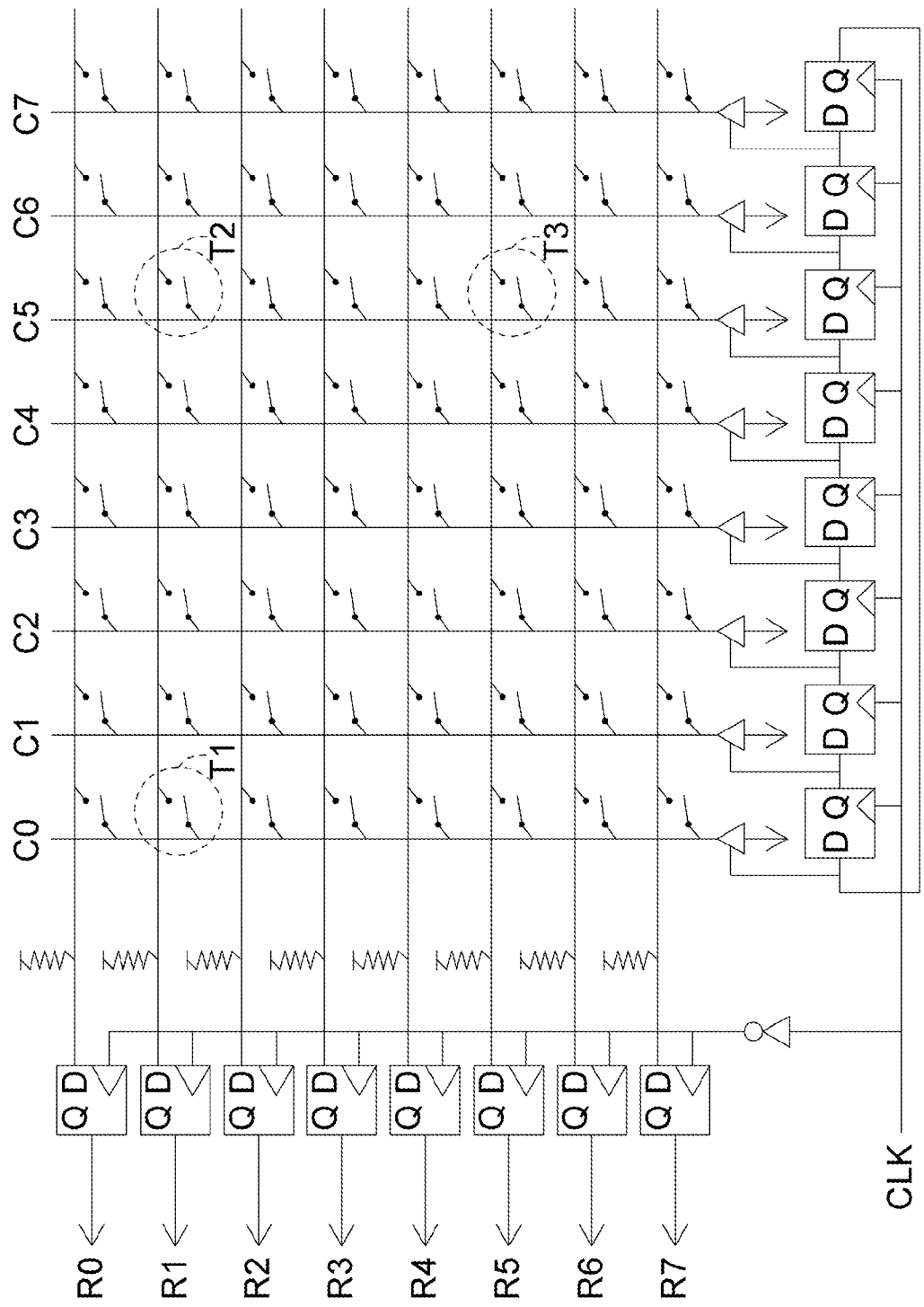
FIG. 2 shows a circuit diagram of a conventional resistive array touch panel.
Figure 3:
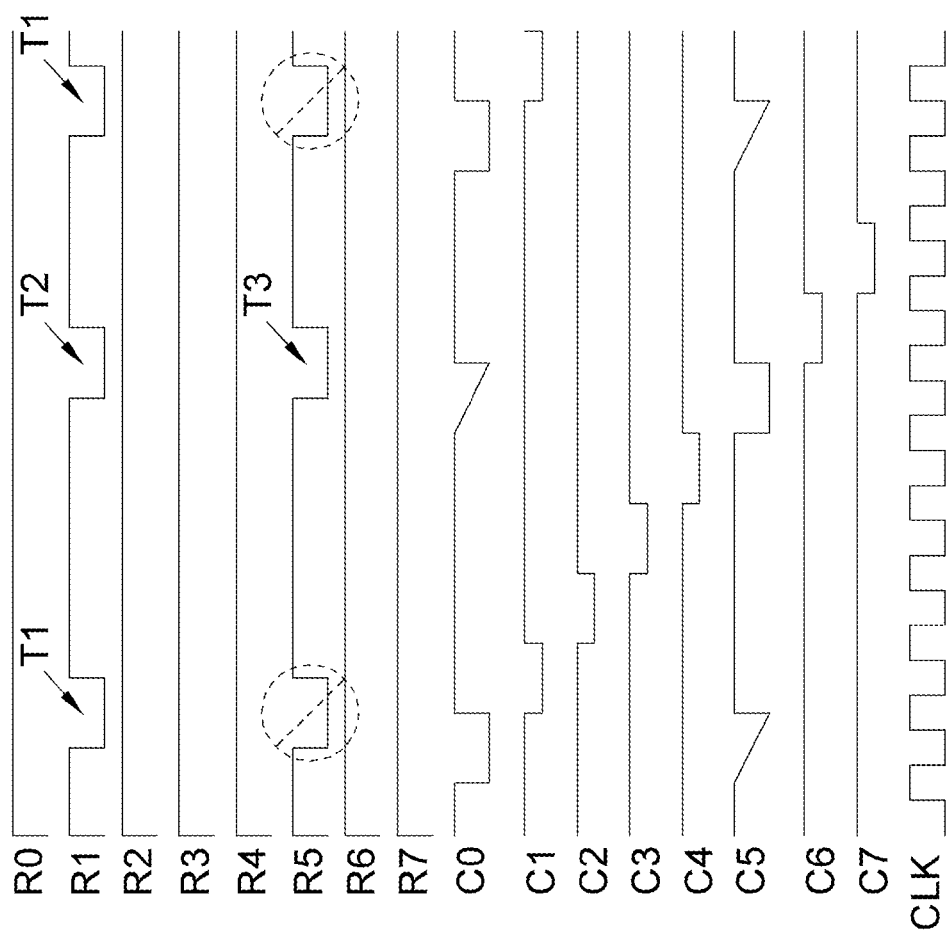
FIG. 3 shows a tactile-signal timing diagram of a conventional resistive array touch panel.
Figure 4:
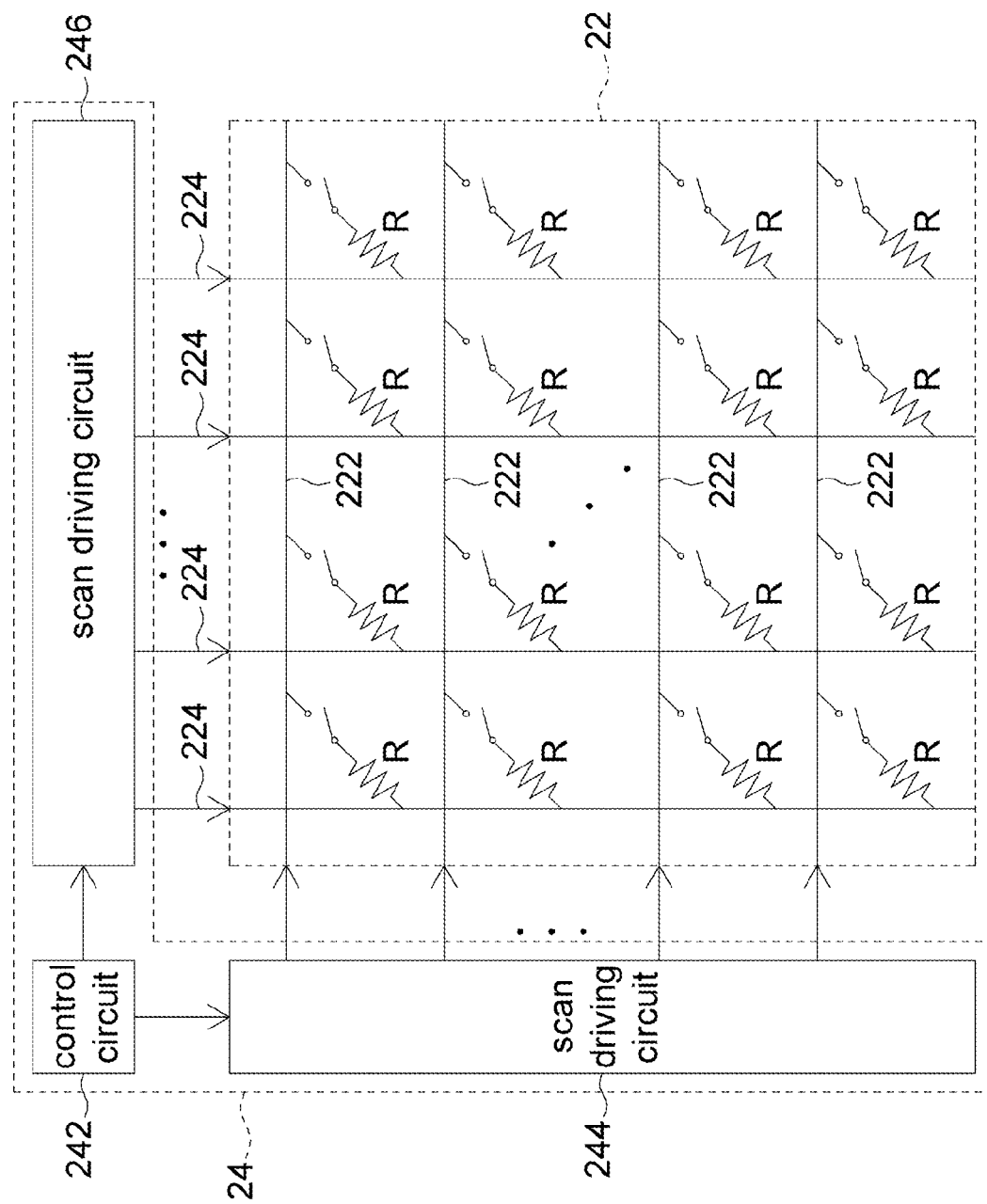
FIG. 4 shows a circuit diagram of a touch apparatus.
Figure 5:
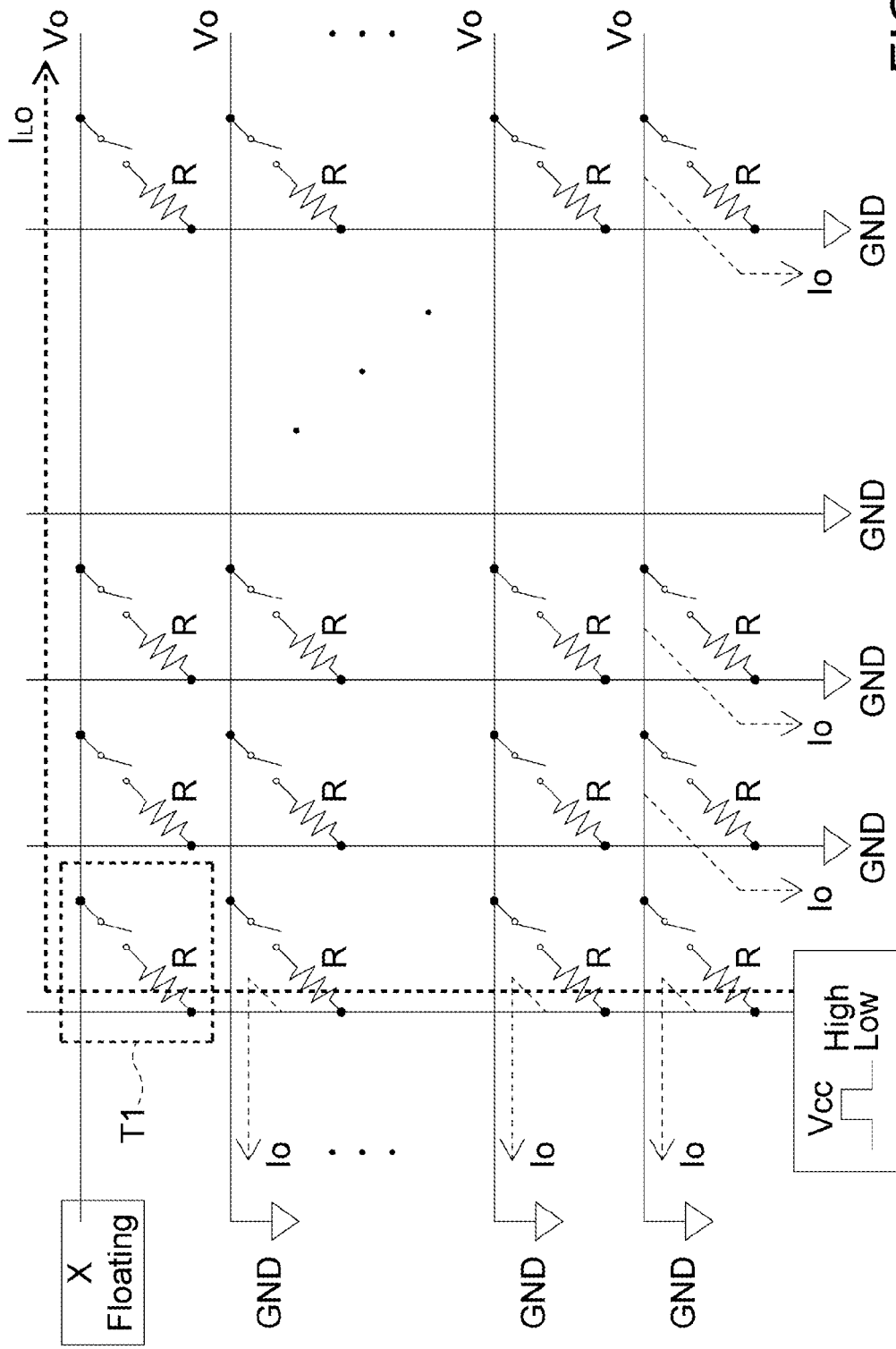
FIG. 5 shows a circuit diagram of a touch panel.

Referring to FIG. 4 and FIG. 5. FIG. 4 shows a circuit diagram of a touch apparatus. FIG. 5 shows a circuit diagram of a touch panel. The touch apparatus 2 comprises a touch panel 22 and a processing unit 24. The processing unit 24 comprises a control circuit 242, a scan driving circuit 244 and a scan driving circuit 246. The scan driving circuit 244, the scan driving circuit 246 and the control circuit 242 are realized by such as microcontroller (MCU), field-programmable gate array (FPGA), application specific integrated circuit (ASIC) or system on chip (SoC). Moreover, the scan driving circuit 244 and the scan driving circuit 246 can further be integrated into the control circuit 242.

The control circuit 242 is for the controlling scan driving circuit 244 and the scan driving circuit 246 to sequentially drive the transparent scan electrode 224 by the tri-state (logic) scan method, wherein the tri-states comprise high impedance input state, low level output state and high level output state. The touch panel 22 at least comprises a plurality of first transparent scan electrodes 222 and a plurality of second transparent scan electrodes 224. The scan driving circuit 244 sequentially scans and drives the transparent scan electrodes 222. The transparent scan electrodes 222 being driven are set in a high impedance input state, and the remaining transparent scan electrodes 222 not being driven are set in a low level output state. The scan driving circuit 246 sequentially scans and drives the transparent scan electrodes 224. The transparent scan electrodes 224 being driven are in a high level output state, and the remaining transparent scan electrodes 224 not being driven are set in a low level output state. The low level state comprises a grounding state or a system lowest level state.

The transparent scan electrode 222 and the transparent scan electrode 224 are formed by such as indium tin oxide (ITO). When the touch point T1 corresponding to a transparent scan electrode 222 being driven and a transparent scan electrode 224 being driven is touched by a force, a sensing voltage Vo is outputted. There is a resistor R corresponding to the high impedance input state disposed between the transparent scan electrode 222 and the transparent scan electrode 224 corresponding to the touch point T1 touched by a force. There is a resistor R disposed between a transparent scan electrode 222 and a transparent scan electrode 224. Thus, the difficulties in recognizing the touch position through back-end scan will arise due to the poor performance in the properties and the stability of the resistive material.

Also, the control circuit 242 is for controlling the scan driving circuit 244 and the scan driving circuit 246 to perform tri-state (logic) scanning. When the touch point T1 is touched by a force, the column electrodes in the first column are set in a high level output state, and the remaining column electrodes are set in a low level output state which is the lowest voltage in the system or the ground. The row electrodes in the first row are set in a high impedance input state and electrically connect a fetch amplifying circuit which fetches a sensing signal of the touch point T1. The remaining row electrodes are set in a low level output state which is the lowest voltage in the system or the ground. Thus, when the touch panel 22 is scanned and driven, the driving current will not form a loop leakage current Io with other unnecessary column electrodes, and will flow to other row electrodes instead. As a result, the back-end voltage sensing circuit signal is interfered and ghost blur (points) occurs accordingly.

The transparent scan electrodes 222 and the transparent scan electrodes 224 are realized by row electrodes and column electrodes respectively, and the scan driving circuit 244 and the scan driving circuit 246 are realized by a row electrode driving circuit and a column electrode driving circuit respectively. According to another implementation, the transparent scan electrodes 222 and the transparent scan electrodes 224 are realized by the column electrodes and the row electrodes respectively, and the scan driving circuit 244 and the scan driving circuit 246 are realized a column electrode driving circuit and a row electrode driving circuit respectively.

Figure 6:
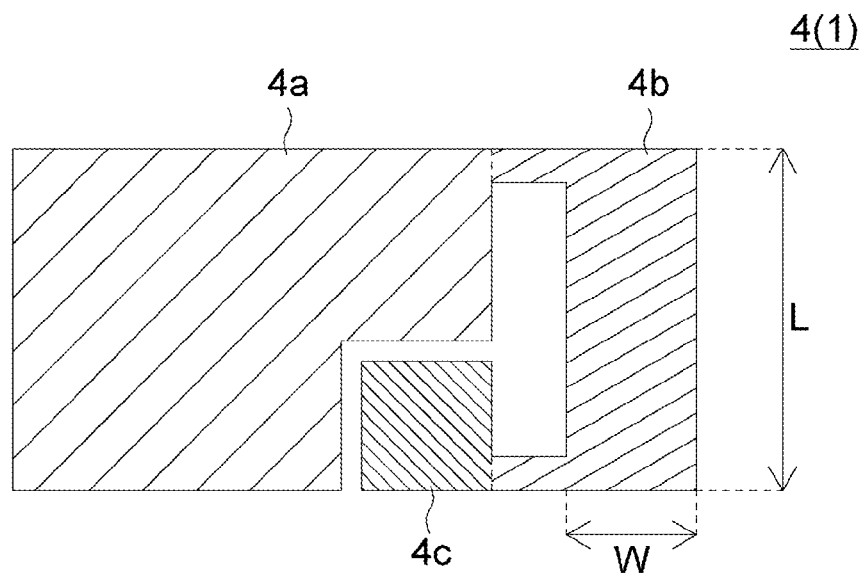
FIG. 6 shows a schematic diagram of transparent scan electrode.

Referring to FIG. 6, a schematic diagram of transparent scan electrode is shown. The transparent scan electrode 4(1) of FIG. 6 can be applied to the transparent scan electrodes 222 or the transparent scan electrodes 224 of FIG. 4. The transparent scan electrode 4(1) comprises a first resistance region 4a, a second resistance region 4b and a contact electrode 4c. The first resistance region 4a, the second resistance region 4b and the contact electrode 4c can be co-planar and manufactured in the same manufacturing process. The contact electrode 4c and the second resistance region 4b are electrically connected, and a bump can further be disposed on the contact electrode 4c for increasing touch sensitivity. The contact electrode 4c is for touching its corresponding transparent scan electrode. For example, if the transparent scan electrode 4(1) is a transparent scan electrode 222 of FIG. 4, then the contact electrode 4c is for touching a transparent scan electrode 224. If the transparent scan electrode 4(1) is a transparent scan electrode 224 of FIG. 4, then the contact electrode 4c is for touching a transparent scan electrode 222.

The touch scan recognition can be optimized when a resistance value of the second resistance region 4b is larger than a resistance value of the first resistance region 4a, and a resistance value of the second resistance region 4b falls within a 10~1000× interval of the first resistance region 4a. The second resistance region forms a resistor R of FIG. 4 by way of prolonging the path length of the electrode, increasing the ratio of the electrode length L to the electrode width W or doping with a heterogeneous conductive material or a high polymer conductive material. The ratio of the electrode length L to the electrode width W of the second resistance region 4b is a predetermined value, which makes the resistance value of the second resistance region 4b higher than that of the first resistance region 4a.

Figure 7:
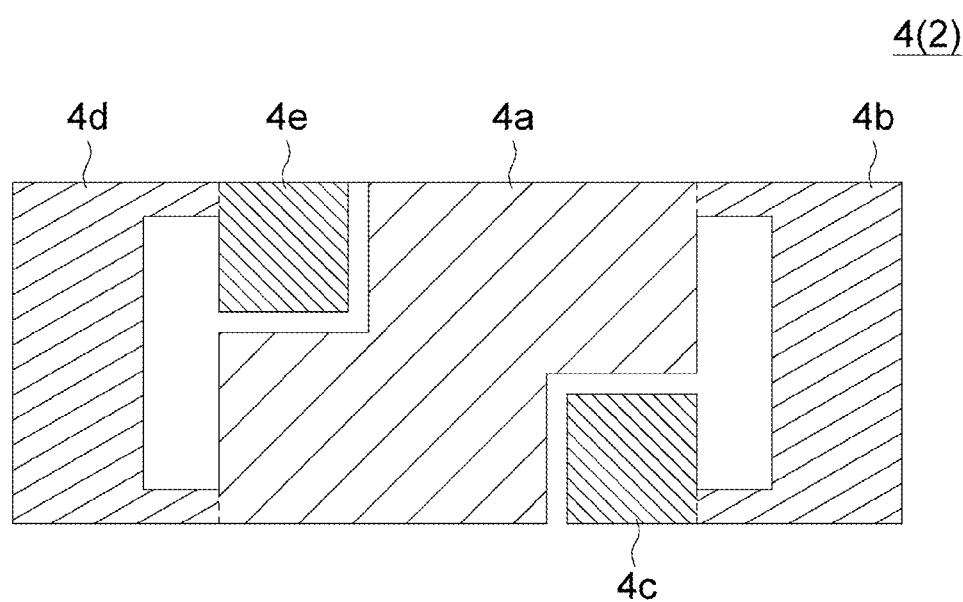
FIG. 7 shows another schematic diagram of transparent scan electrode.
Figure 8A:
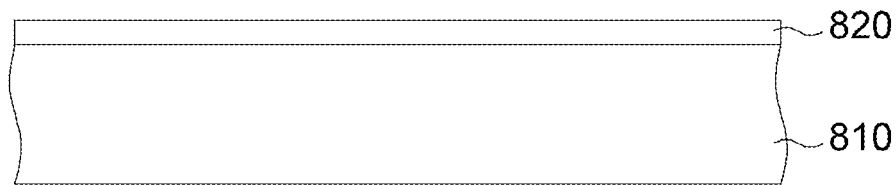
FIG. 8A~8D shows a manufacturing flowchart of a geometric structure of a transparent scan electrode.
Figure 8B:
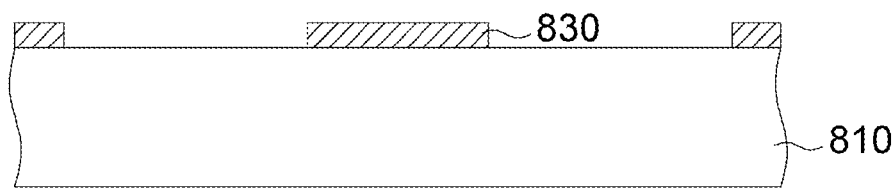
Figure 8C:
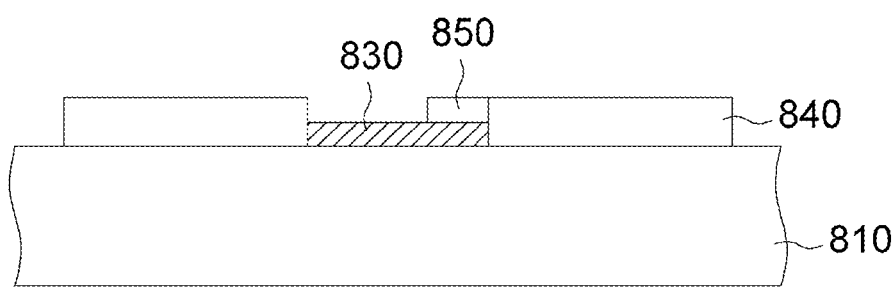
Figure 8D:
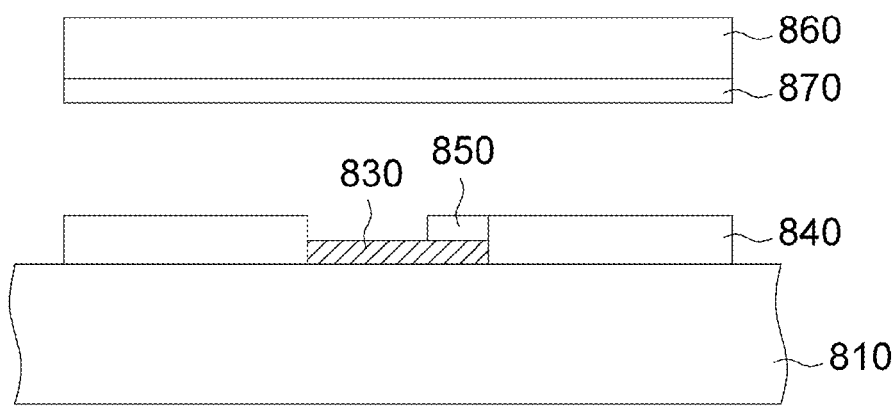

Referring to FIG. 7, another schematic diagram of transparent scan electrode is shown. The transparent scan electrode 4(2) is different from the transparent scan electrode 4(1) in that: the transparent scan electrode 4(2) further comprises a third resistance region 4d and a contact electrode 4e. The contact electrode 4e electrically connects the third resistance region 4d. The third resistance region 4d and the second resistance region 4b are electrically cascaded through the first resistance region 4a. The third resistance region 4d can be implemented in a manner similar to or different from that of the second resistance region 4b. After the third resistance region 4d and the second resistance region 4b are electrically cascaded, the resistance of the resistor R can be further increased. The first resistance region 4a, the second resistance region 4b, the contact electrode 4c and the third resistance region 4d can be co-planar and manufactured in the same manufacturing process.

Figure 9:
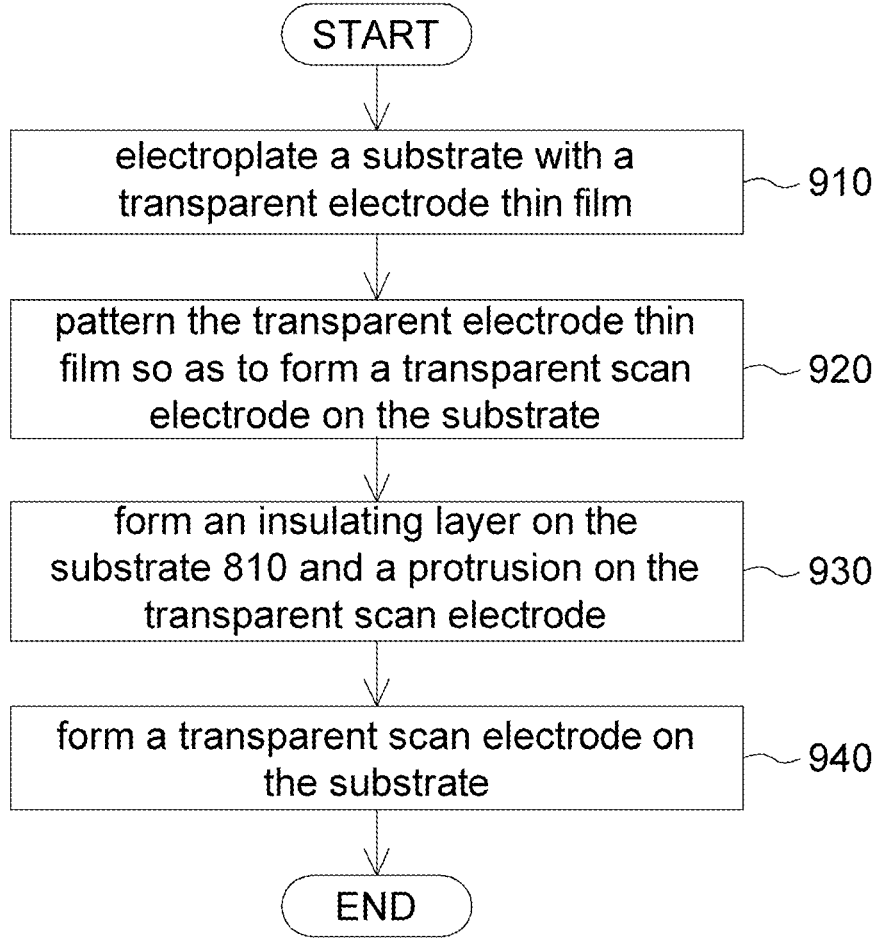
FIG. 9 shows a flowchart of a method of manufacturing a geometric structure of a transparent scan electrode.

Referring to FIG. 8A~8D and FIG. 9. FIG. 8A~8D show a manufacturing flowchart of a geometric structure of a transparent scan electrode. FIG. 9 shows a flowchart of a method of manufacturing a geometric structure of a transparent scan electrode. Firstly, the method begins at step 910, a substrate 810 is electroplated with a transparent electrode thin film 820, wherein the substrate 810 is realized by a glass substrate or a transparent substrate (made from the material such as polyester PET, polyimide PI, or polycarbonate PC). Next, the method proceeds to step 920, the transparent electrode thin film 820 is patterned so as to form a transparent scan electrode 830 on the substrate 810. The transparent scan electrode 830 can be realized by a strip (line, film) electrode, the transparent scan electrode 4(1) of FIG. 6 or the transparent scan electrode 4(2) of FIG. 7. Then, the method proceeds to step 930, an isolative layer 840 is formed on the substrate 810 and a bump 850 is formed on the transparent scan electrode 830. After that, the method proceeds to step 940, a transparent scan electrode 870 is formed on the substrate 860, wherein the substrates 810 and 860 are vertically aligned and combined. The substrate 860 can be realized by a polyester (PET) thin film, and the transparent scan electrode 870 can be realized by a strip (line, film) electrode, the transparent scan electrode 4(1) of FIG. 6 or the transparent scan electrode 4(2) of FIG. 7.

First Embodiment

Figure 10:
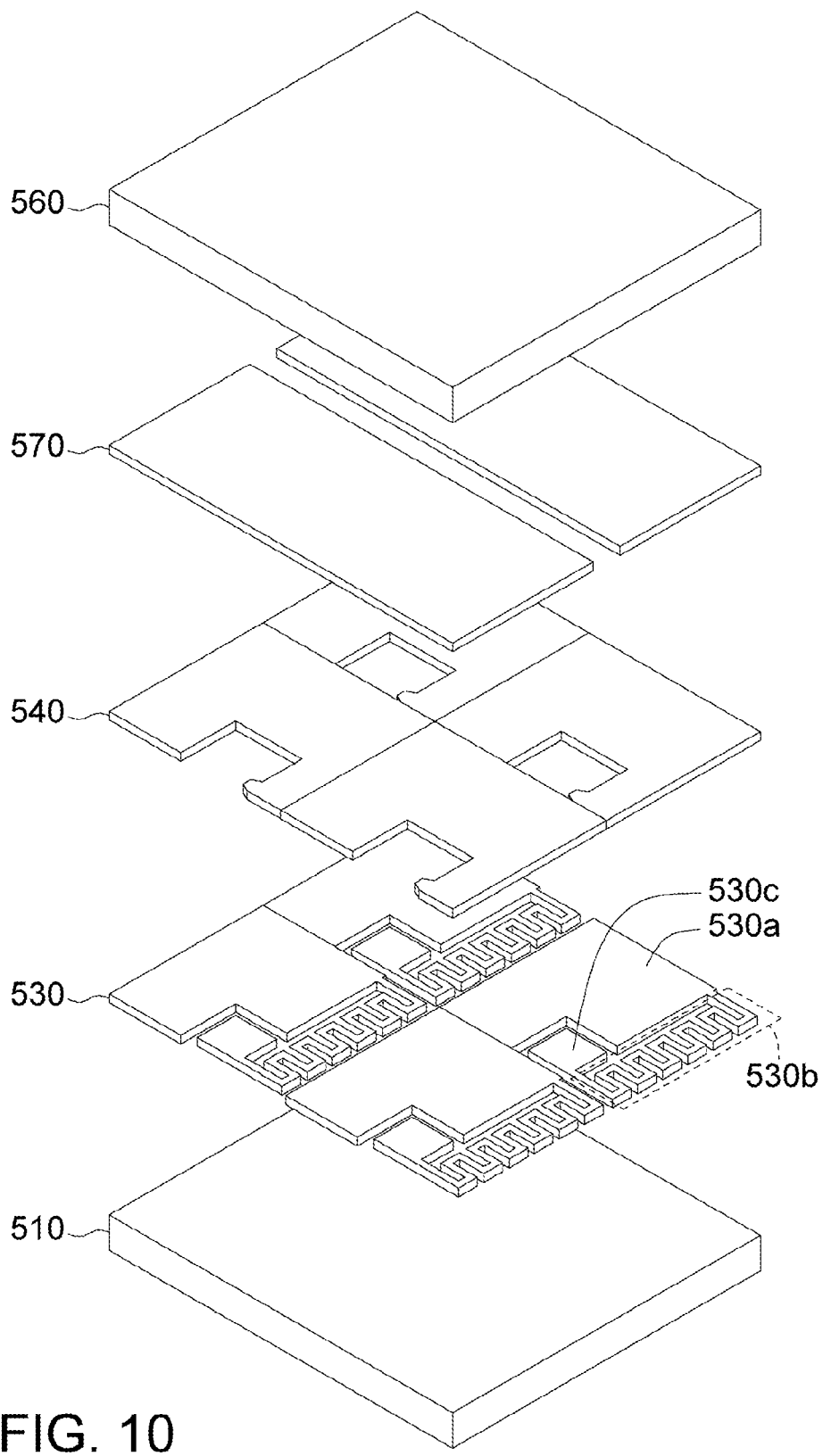
FIG. 10 shows a schematic diagram of a transparent scan electrode structure according to a first embodiment.

Referring to FIG. 10, a schematic diagram of a transparent scan electrode structure according to a first embodiment is shown. The transparent scan electrode structure comprises a substrate 510, a transparent scan electrode 530, an isolative layer 540, a transparent scan electrode 570 and a substrate 560. The transparent scan electrode 530 is disposed between the substrate 510 and the isolative layer 540, and the transparent scan electrode 570 is disposed between the substrate 560 and the isolative layer 540. In the first embodiment, the transparent scan electrode 570 is realized by a strip (line, film) electrode, and the transparent scan electrode 530 is realized by the transparent scan electrode 4(1) of FIG. 6. The transparent scan electrode 530 further comprises a first resistance region 530a, a second resistance region 530b and a contact electrode 530c. The second resistance region 530b comprises a geometric bent electrode, which is extended outward from the first resistance region 530a and has consecutive bends to prolong the path length of the electrode.

Second Embodiment

Figure 11:
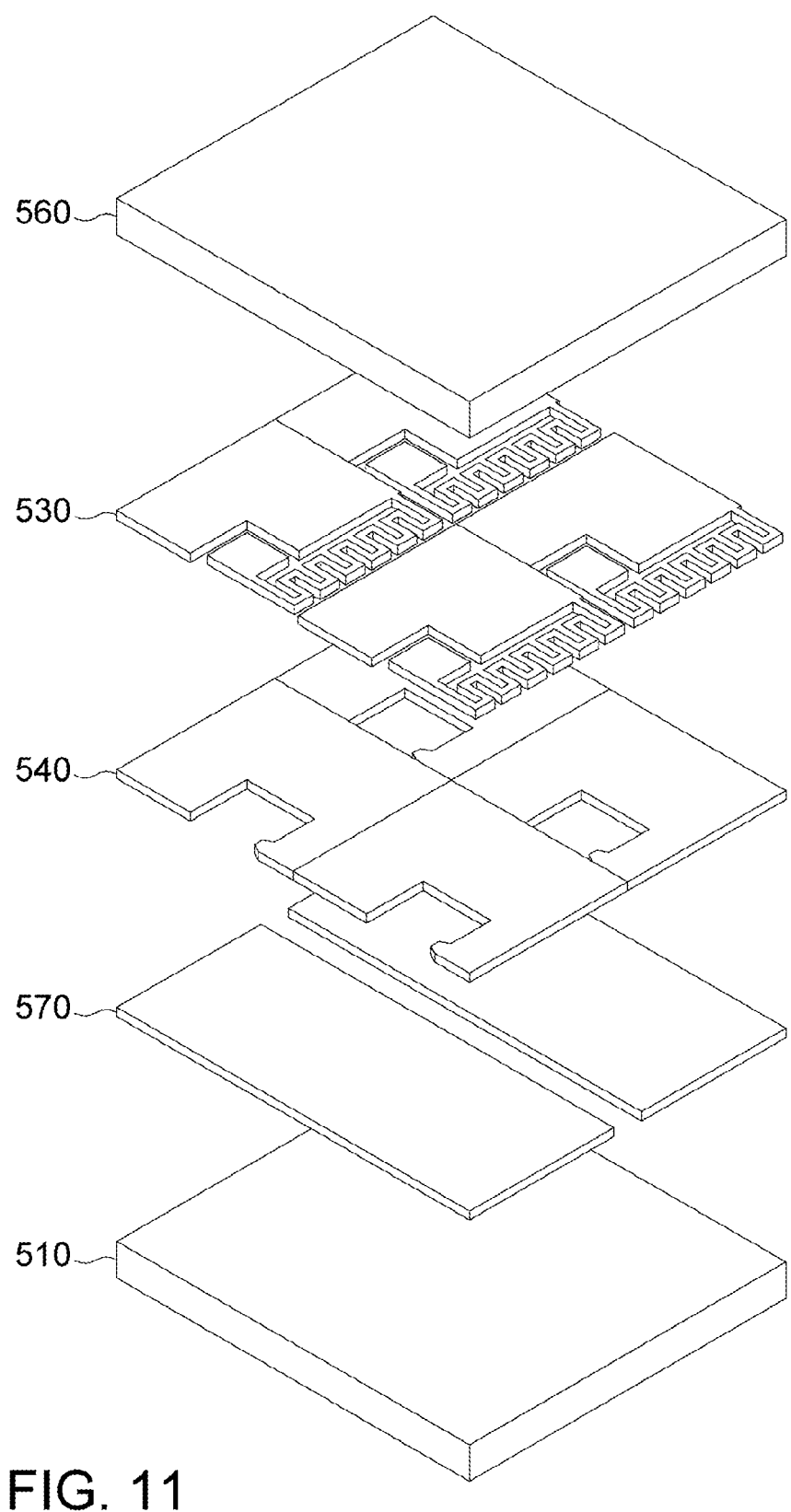
FIG. 11 shows a schematic diagram of a transparent scan electrode structure according to a second embodiment.

Referring to FIG. 11, a schematic diagram of a transparent scan electrode structure according to a second embodiment is shown. The second embodiment is different from the first embodiment in that: the transparent scan electrode 570 is disposed between the substrate 510 and the isolative layer 540, and the transparent scan electrode 530 is disposed between the substrate 560 and the isolative layer 540.

Third Embodiment

Figure 12:
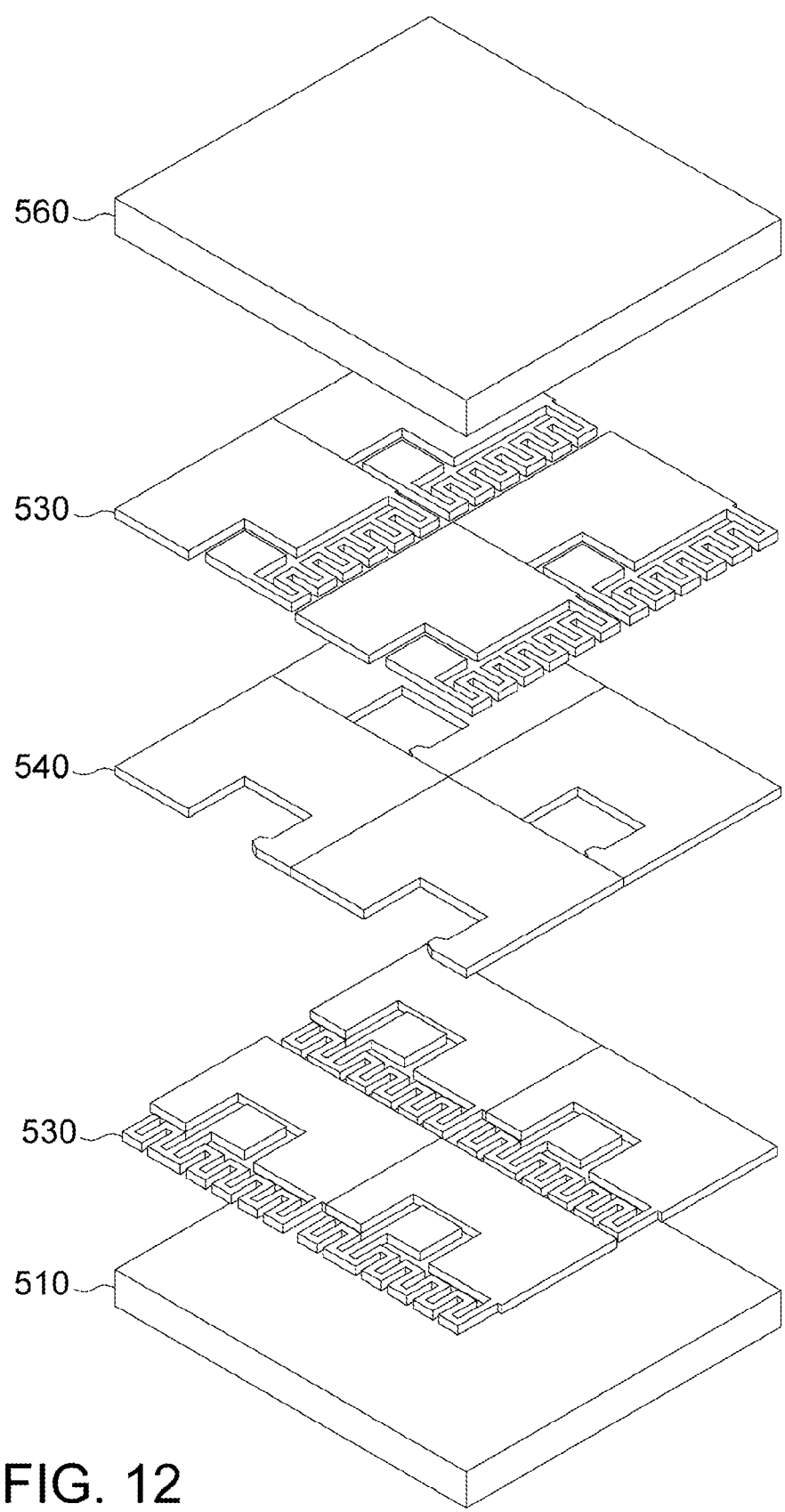
FIG. 12 shows a schematic diagram of a transparent scan electrode structure according to a third embodiment.

Referring to FIG. 12, a schematic diagram of a transparent scan electrode structure according to a third embodiment is shown. The third embodiment is different from the first embodiment in that: the transparent scan electrode structure of the third embodiment adopts two transparent scan electrode structures 530 respectively disposed between the substrate 510 and the isolative layer 540 and between the substrate 560 and the isolative layer 540, and the transparent scan electrode structure 530 located under the isolative layer 540 is a horizontal rotation of 90 degrees of the transparent scan electrode structure 530 located above the isolative layer 540.

Fourth Embodiment

Figure 13:
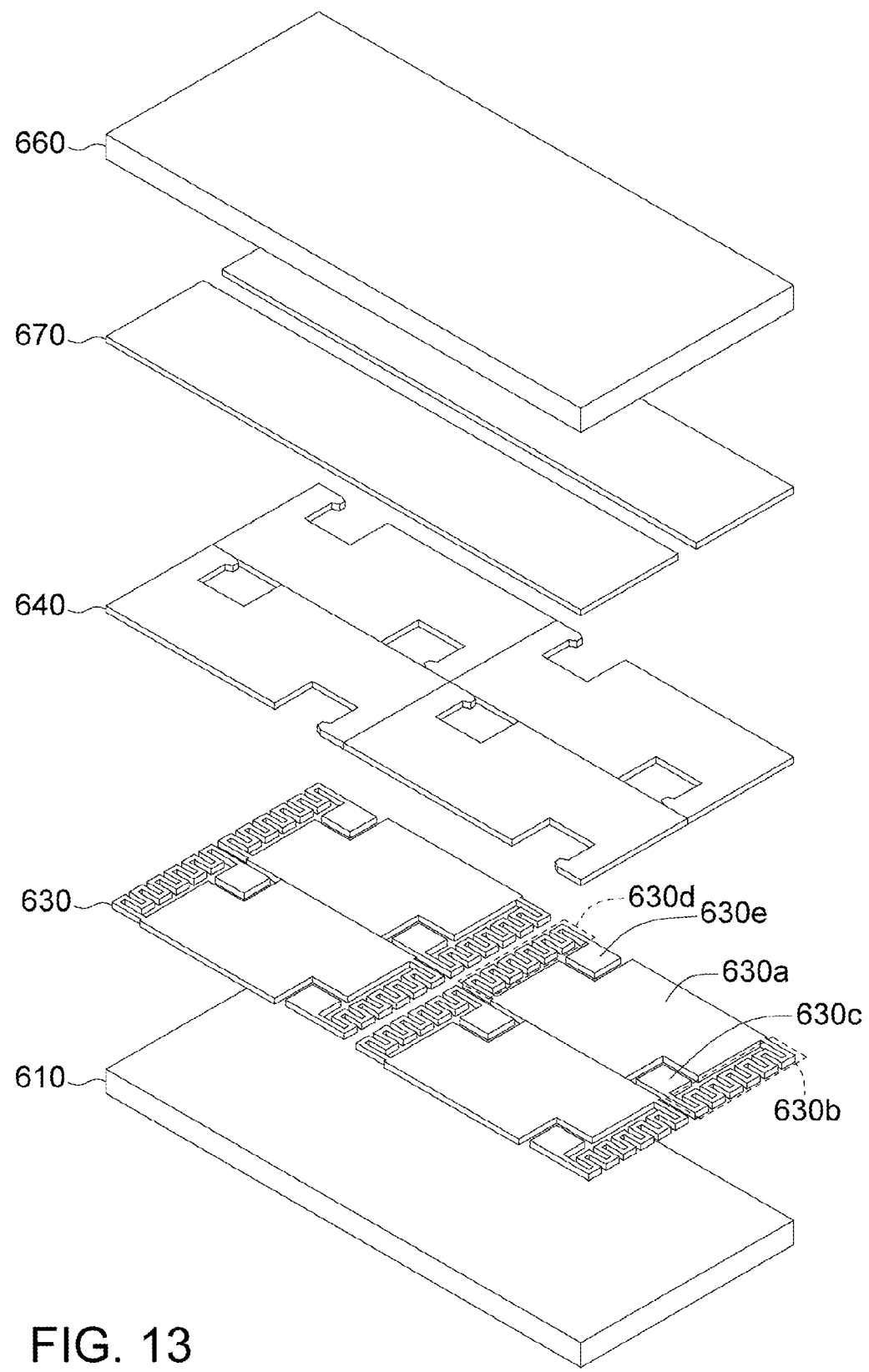
FIG. 13 shows a schematic diagram of a transparent scan electrode structure according to a fourth embodiment.

Referring to FIG. 13, a schematic diagram of a transparent scan electrode structure according to a fourth embodiment is shown. The transparent scan electrode structure comprises a substrate 610, a transparent scan electrode 630, an isolative layer 640, a transparent scan electrode 670 and a substrate 660. The transparent scan electrode 630 is disposed between the substrate 610 and the isolative layer 640, and the transparent scan electrode 670 is disposed between the substrate 660 and the isolative layer 640. In the fourth embodiment, the transparent scan electrode 670 is realized by a strip (line, film) electrode, and the transparent scan electrode 630 is realized by the transparent scan electrode 4(1) of FIG. 7. The transparent scan electrode 630 further comprises a first resistance region 630a, a second resistance region 630b, a contact electrode 630c, a third resistance region 630d and a contact electrode 630e. The second resistance region 630b comprises a geometric bent electrode, which is extended outward from the first resistance region 630a and is continuously bent to prolong the path length of the electrode. The first resistance region 630a is connected to the contact electrode 630c through the second resistance region 630b. Likewise, the third resistance region 630d comprises a geometric bent electrode, which is extended outward from the first resistance region 630a and has consecutive bends to prolong the path length of the electrode. The first resistance region 630a is connected to the contact electrode 630e through the third resistance region 630d.

Fifth Embodiment

Figure 14:
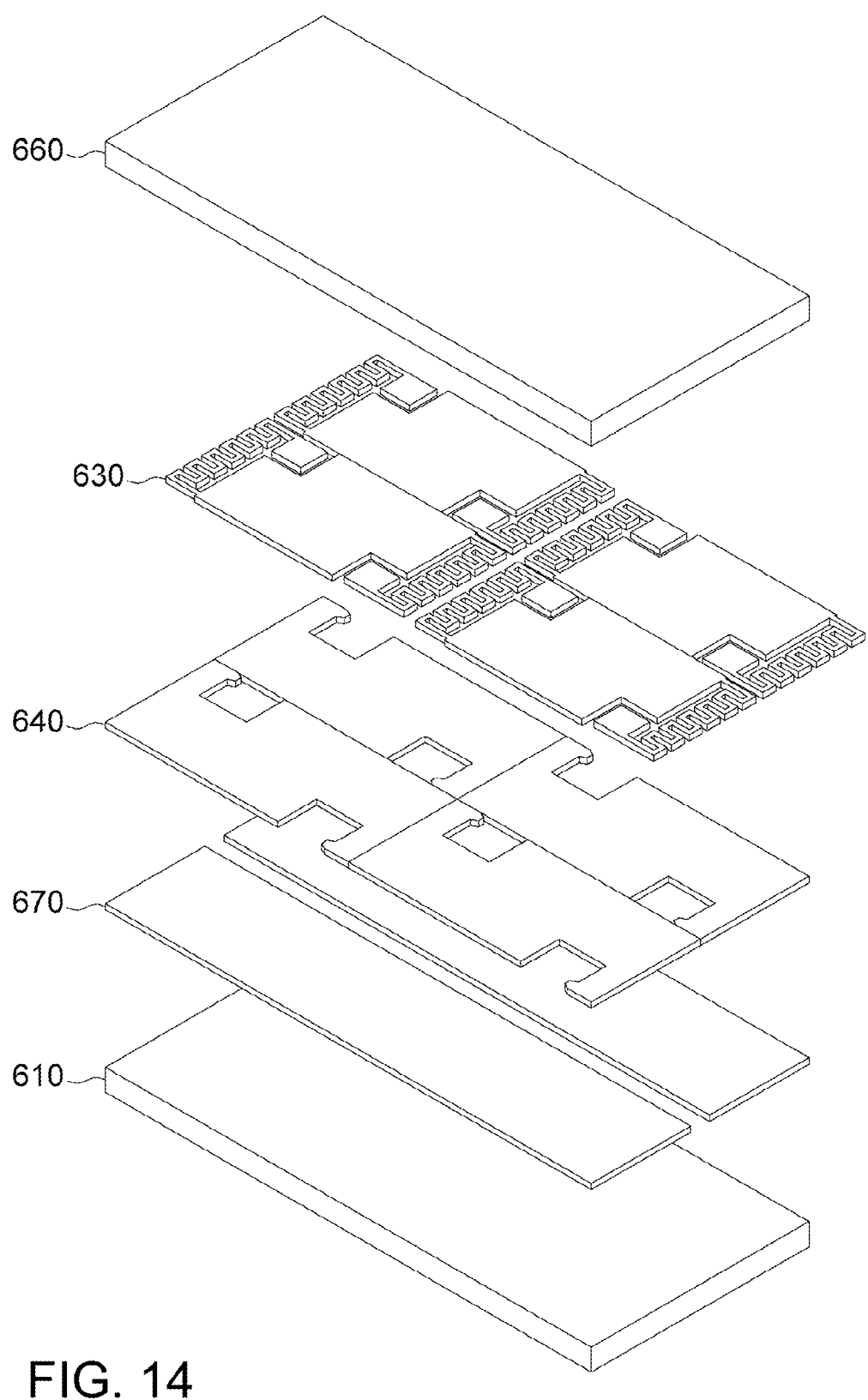
FIG. 14 shows a schematic diagram of a transparent scan electrode structure according to a fifth embodiment.

Referring to FIG. 14, a schematic diagram of a transparent scan electrode structure according to a fifth embodiment is shown. The fifth embodiment is different from the fourth embodiment in that: the transparent scan electrode 670 is disposed between the substrate 610 and the isolative layer 640, and the transparent scan electrode 630 is disposed between the substrate 660 and the isolative layer 640.

Sixth Embodiment

Figure 15:
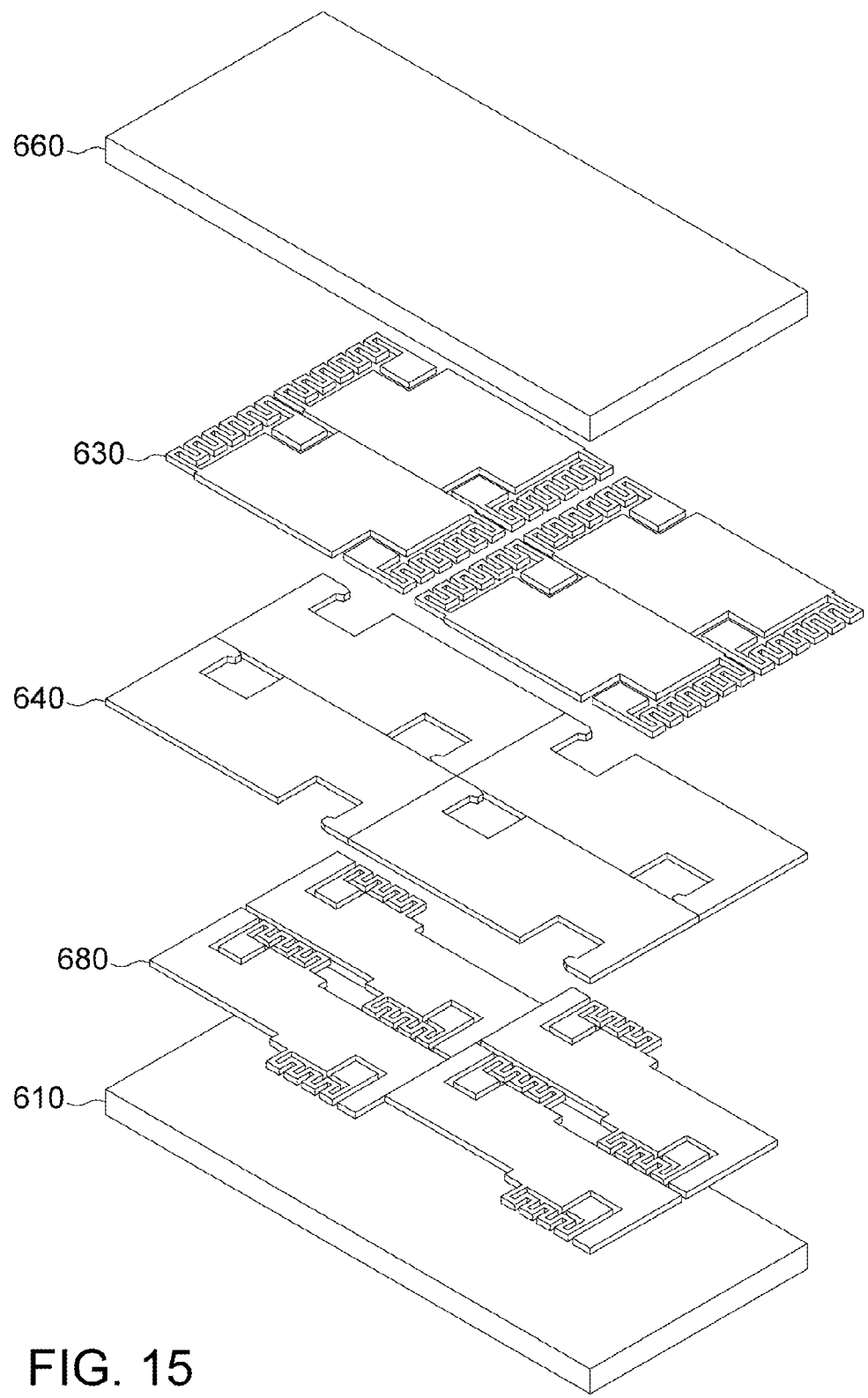
FIG. 15 shows a schematic diagram of a transparent scan electrode structure according to a sixth embodiment.

Referring to FIG. 15, a schematic diagram of a transparent scan electrode structure according to a sixth embodiment is shown. The sixth embodiment is different from the fifth embodiment in that: the transparent scan electrode structure 680 of the sixth embodiment replaces the transparent scan electrode structure 670 of the fifth embodiment. When the transparent scan electrode structure 680 contacts the transparent scan electrode structure 630, the second resistance region of the transparent scan electrode structure 680 is serially connected to the second resistance region of the transparent scan electrode structure 630 to further increase the resistance value.

The touch apparatus, the transparent scan electrode structure and the manufacturing method thereof disclosed in the above embodiments of the disclosure have many advantages exemplified below:
1. The poor performance in material properties and stability of the resistive material is improved;
2. Scan recognition rate is increased for both the second resistance region and the first resistance region;
3. Ghost blur (points) is improved.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transparent scan electrode structure, comprising:
   a first transparent scan electrode, comprising:
   a first resistance region; and
   a second resistance region, wherein a resistance value of the second resistance region is higher than that of the first resistance region;
   a second transparent scan electrode; and
   an isolative layer disposed between the first transparent scan electrode and the second transparent scan electrode.

2. The transparent scan electrode structure according to claim 1, wherein the first transparent scan electrode further comprises a contact electrode connected to the second resistance region for contacting the second transparent scan electrode.

3. The transparent scan electrode structure according to claim 2, further comprising a bump disposed on the contact electrode.

4. The transparent scan electrode structure according to claim 1, wherein the resistance value of the second resistance region falls within a 10~1000X interval of the first resistance region.

5. The transparent scan electrode structure according to claim 1, wherein the second resistance region comprises a geometric bent electrode.

6. The transparent scan electrode structure according to claim 5, wherein the geometric bent electrode is extended outward from the first resistance region and has consecutive bends to prolong the path length of the electrode.

7. The transparent scan electrode structure according to claim 1, wherein the ratio of the electrode length to the electrode width of the first second resistance region is a predetermined value, which makes the resistance value of the second resistance region higher than that of the first resistance region.

8. The transparent scan electrode structure according to claim 1, wherein the second resistance region is doped with a heterogeneous conductive material or a high polymer conductive material.

9. The transparent scan electrode structure according to claim 1, wherein the second transparent electrode comprises:
   a third resistance region; and
   a fourth resistance region, wherein a resistance value of the fourth resistance region is higher than that of the third resistance region.

10. The transparent scan electrode structure according to claim 9, wherein the second transparent scan electrode further comprises a contact electrode connected to the fourth resistance region for contacting the first transparent scan electrodes.

11. The transparent scan electrode structure according to claim 10, further comprising a bump disposed on the contact electrode.

12. The transparent scan electrode structure according to claim 9, wherein the resistance value of the fourth resistance region falls within 10~1000X interval of the second third resistance region.

13. The transparent scan electrode structure according to claim 9, wherein the fourth resistance region comprises a geometric bent electrode.

14. The transparent scan electrode structure according to claim 13, wherein the geometric bent electrode is extended outward from thethird resistance region and has consecutive bends to prolong the path length of the second transparent scan electrode.

15. The transparent scan electrode structure according to claim 9, wherein the ratio of the electrode length to the electrode width of the fourth resistance region is a predetermined value, which makes the resistance value of the fourth resistance region higher than that of the third resistance region.

16. The transparent scan electrode structure according to claim 9, wherein the fourth resistance region is doped with a heterogeneous conductive material or a high polymer conductive material.

17. The transparent scan electrode structure according to claim 1, wherein the first transparent scan electrode further comprises:
   a third resistance region serially connected to the second resistance region.

18. A touch apparatus, comprising:
   a touch panel, comprising:
   a plurality of first transparent scan electrodes, each comprising:
   a first resistance region;
   a second resistance region, wherein a resistance value of the second resistance region is higher than that of the first resistance region;
   a plurality of second transparent scan electrodes; and
   an isolative layer disposed between the first transparent scan electrodes and the second transparent scan electrodes; and
   a processing unit for sequentially scanning and driving the first transparent scan electrodes and the second transparent scan electrodes, wherein the first transparent scan electrodes being driven are set in a high level output state, the first transparent scan electrodes not being driven are set in a low level output state, the second transparent scan electrodes being driven are in a high impedance input state, and the second transparent scan electrodes not being driven are set in a low level output state.

19. The touch apparatus according to claim 18, wherein the first transparent scan electrode further comprises a contact electrode connected to the second resistance region for contacting the second transparent scan electrodes.

20. The touch apparatus according to claim 19, further comprising a bump disposed on the contact electrode.

21. The touch apparatus according to claim 18, wherein the resistance value of the second resistance region falls within a 10~1000X interval of the first resistance region.

22. The touch apparatus according to claim 18, wherein the second resistance region comprises a geometric bent electrode.

23. The touch apparatus according to claim 22, wherein the geometric bent electrode is extended outward from the first resistance region and has consecutive bends to prolong the path length of the electrode.

24. The touch apparatus according to claim 18, wherein the ratio of the electrode length to the electrode width of the second resistance region is a predetermined value, which makes the resistance value of the second resistance region higher than that of the first resistance region.

25. The touch apparatus according to claim 18, wherein the second resistance region is doped with a heterogeneous conductive material or a high polymer conductive material.

26. The touch apparatus according to claim 18, wherein the second transparent electrode comprises:
   a third resistance region; and
   a fourth resistance region, wherein a resistance value of the fourth resistance region is higher than that of the third resistance region.

27. The touch apparatus according to claim 26, wherein the second transparent scan electrodes further comprises a contact electrode connected to the fourth resistance region for contacting the first transparent scan electrodes.

28. The touch apparatus according to claim 27, further comprising a bump disposed on the contact electrode.

29. The touch apparatus according to claim 26, wherein the resistance value of the fourth resistance region falls within a 10~1000X interval of the third resistance region.

30. The touch apparatus according to claim 26, wherein the fourth resistance region comprises a geometric bent electrode.

31. The touch apparatus according to claim 30, wherein the geometric bent electrode is extended outward from the third resistance region and has consecutive bends to prolong the path length of the second transparent scan electrodes.

32. The touch apparatus according to claim 26, wherein the ratio of the electrode length to the electrode width of the fourth resistance region is a predetermined value, which makes the resistance value of the fourth resistance region higher than that of the third resistance region.

33. The touch apparatus according to claim 26, wherein the fourth resistance region is doped with a heterogeneous conductive material or a high polymer conductive material.

34. The touch apparatus according to claim 18, wherein the first transparent scan electrode further comprises:
   a third resistance region serially connected to the second resistance region.

35. The touch apparatus according to claim 18, wherein the processing unit comprises:
   a first scan driving circuit for sequentially scanning and driving the first transparent scan electrodes, wherein the first transparent scan electrodes being driven are set in a high level output state, and the first transparent scan electrodes not being driven are set in a low level output state;
   a second scan driving circuit for sequentially scanning and driving the second transparent scan electrodes, wherein the second transparent scan electrodes being driven are in a high impedance input state, and the second transparent scan electrodes not being driven are set in a low level output state; and
   a control circuit for controlling the first scan driving circuit and the second scan driving circuit.

36. A manufacturing method of a transparent scan electrode structure, comprising:
   forming a first transparent scan electrode on a first substrate, wherein the first transparent scan electrode comprises a first resistance region and a second resistance region, and a resistance value of the second resistance region is higher than that of the first resistance region;
   forming a second transparent scan electrode on a second substrate;
   forming an isolative layer on the first substrate; and
   vertically aligning and combining the first substrate and the second substrate are.

37. The manufacturing method according to claim 36, wherein the first transparent scan electrode further comprises a contact electrode connected to the second resistance region for contacting the second transparent scan electrodes.

38. The manufacturing method according to claim 37, further comprising:
   disposing a bump on the contact electrode.

39. The manufacturing method according to claim 36, wherein the resistance value of the second resistance region falls within a 10~1000X interval of the first resistance region.

40. The manufacturing method according to claim 36, wherein the second resistance region comprises a geometric bent electrode.

41. The manufacturing method according to claim 40, wherein the geometric bent electrode is extended outward from the first resistance region and has consecutive bends to prolong the path length of the electrode.

42. The manufacturing method according to claim 36, wherein the ratio of the electrode length to the electrode width of the second resistance region is a predetermined value, which makes the resistance value of the second resistance region higher than that of the first resistance region.

43. The manufacturing method according to claim 36, wherein the first second resistance region is doped with a heterogeneous conductive material or a high polymer conductive material.

44. The manufacturing method according to claim 36, wherein the second transparent electrode comprises:
   a third resistance region; and
   a fourth resistance region, wherein a resistance value of the fourth resistance region is higher than that of the third resistance region.

45. The manufacturing method according to claim 43, wherein the second transparent scan electrode further comprises a contact electrode connected to the fourth resistance region for contacting the first transparent scan electrodes.

46. The manufacturing method according to claim 45, further comprising:
   disposing a bump on the contact electrode.

47. The manufacturing method according to claim 44, wherein the resistance value of the fourth resistance region falls within a 10~1000X interval of the third resistance region.

48. The manufacturing method according to claim 44, wherein the fourth resistance region comprises a geometric bent electrode.

49. The manufacturing method according to claim 48, wherein the geometric bent electrode is extended outward from the third resistance region and has consecutive bends to prolong the path length of the second transparent scan electrodes.

50. The manufacturing method according to claim 44, wherein the ratio of the electrode length to the electrode width of the fourth resistance region is a predetermined value, which makes the resistance value of the fourth resistance region higher than that of the third resistance region.

51. The manufacturing method according to claim 44, wherein the fourth resistance region is doped with a heterogeneous conductive material or a high polymer conductive material.

52. The manufacturing method according to claim 36, wherein the first transparent scan electrodes further comprises:
   a third resistance region serially connected to the second resistance region.

\* \* \* \* \*